Patented July 4, 1950

2,514,325

UNITED STATES PATENT OFFICE 2,514,325

4,6-ALPHA-PYRONE DERIVATIVES

Josef Fried, New Brunswick, N. J., assignor, by mesne assignments, to William R. Warner & Co., Inc., New York, N. Y., a corporation of Delaware No Drawing. Application January 9, 1947, Serial No. 721,149

2 Claims. (Cl. 260—344)

This invention relates to 4,6-alpha-pyrone derivatives, and to a process for preparing them.

The novel products of this invention may be represented according to their structural formulae as follows:

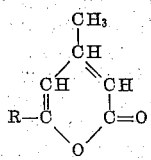

wherein R is a member selected from the group consisting of radicals whose structures may be represented as follows:

Phenyl

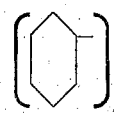

3,4-dioxymethylene phenyl-1-

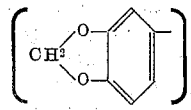

and 5,6 Δ-etiocholenyl

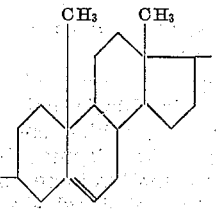

wherein $R_1$ is a member selected from the group consisting of H, OH and $CH_3COO$ radicals.

The new substances are prepared by heating above their melting points substances having the general formula:

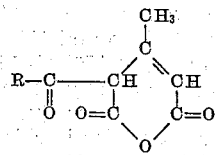

wherein R has the same significance as above. The novel process of this invention is not limited to the heat treatment of such substances only but is applicable so long as R in the foregoing formula is an organic radical, for example, alkyl, aralkyl, aryl, cycloaliphatic and steroid-like radicals. It is desirable to continue the heating until no more carbon dioxide evolves from the reaction chamber.

The initial materials subjected to heat to form the compounds of this invention are themselves novel and form the subject-matter of a copending application, Serial No. 721,148, filed contemporaneously herewith. They are prepared by treating the suitable acyl halides such as benzoyl chloride, piperonylyl chloride, or 3-acetoxy-Δ5,6-etiocholenyl chloride with beta-methyl glutaconic anhydride in the presence of tertiary bases, such as pyridine, at low temperatures (from −20° C. to 0° C.).

The products of this invention are useful as intermediates in the preparation of numerous organic chemicals, includes biologically-active materials. They also possess desirable therapeutic properties.

In order more fully to illustrate this invention the following examples are given. All operations were performed in an atmosphere of pure nitrogen and temperatures given are in degrees centigrade.

EXAMPLE I

*Preparation of 4-methyl-6-phenyl-alpha-pyrone*

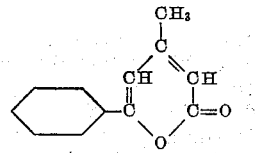

3 grams of beta-methyl glutaconic anhydride were dissolved in 15 cc. of dry C. P. pyridine (dried over BaO) which had been chilled to −20° C. and a solution of 3 cc. of redistilled benzoyl chloride in 10 cc. of pyridine of −20° C. was poured in rapidly. The mixture turned green instantaneously and a precipitate of pyridine hydrochloride appeared. After keeping at −15° C. to −20° C. for one hour, the mixture was kept in the refrigerator for 49 hours and then diluted with an equal volume of ice. This solution was poured with stirring into 30 cc. of concentrated hydrochloric acid containing 40 cc. of ice. The green precipitate was filtered, washed with ice water and dried. Recrystallization from ethyl acetate gave fat prisms, which melt at 101°-103° C., and give a purple coloration with ferric chloride in alcohol.

Analysis: Calc'd for $C_{13}H_{10}O_4$: C, 67.8; H, 4.4. Found: C, 67.9; H, 4.2.

200 mg. of alpha-benzoyl-beta-methyl glutaconic anhydride prepared as above were heated to 105° C.–110° C. and 50 mm. pressure. The melt turned red and carbon dioxide escaped. The temperature was finally raised to 130° C.–140° C. and the evolution of gas subsided after 4 to 5 hours. The mass solidified on cooling. It was extracted with ligroine, from which prismatic needles deposited on cooling. Recrystallization from ethyl acetate and pentane gave the pure compound, which melted at 87° C.

Analysis: Calc'd for $C_{12}H_{12}O_2$: C, 77.4; H, 5.4. Found: C, 77.2; H, 5.1.

The above substance could also be obtained by refluxing 200 mg. of alpha-benzoyl-beta-methyl glutaconic anhydride with 2 cc. of glacial acetic acid for 2 hours, pouring the solution into ice-sodium bicarbonate and recrystallizing the precipitate as described above.

EXAMPLE II

*Preparation of 4-methyl-6-(3,4-dioxy-methylene phenyl) alpha-pyrone*

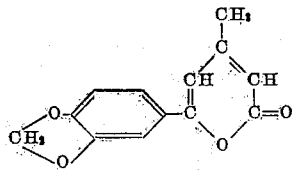

To a solution of 7.6 grams of beta-methyl glutaconic anhydride in 30 cc. of absolute pyridine was added a solution of piperonylyl chloride (from 10 grams of piperonylic acid and thionyl chloride) in 20 cc. benzene with stirring and cooling to –15° C. 10 more cc. of pyridine were added and the reaction mixture was kept in the refrigerator for 24 hours. At the end of this period, chloroform was added and the mixture extracted with 50 cc. concentrated hydrochloric acid and 100 grams of ice. A good deal of piperonylic acid deposited during this procedure and this was removed by filtration. The chloroform solution was washed with water and evaporated to dryness in vacuo. The residue contained the desired alpha-piperonylyl-beta-methyl glutaconic anhydride together with some piperonylic acid. The mixture gave a strong coloration with ferric chloride in alcohol.

The product was heated to 110° C. at 50 mm. pressure to split off carbon dioxide. While the decomposition went on the temperature was slowly raised to 135° C. When the gas evolution became weak, the heating was discontinued and the residue taken up in chloroform and 10% sodium carbonate. The chloroform solution containing the neutral products was washed with water and evaporated to dryness in vacuo. The dark red residue was taken up in benzene and some resinous impurities removed by careful precipitation with pentane. The solution was decanted from the dark colored residue and evaporated to small volume. On standing overnight in the refrigerator, crystals deposited, which were filtered and washed with little cold benzene. The crystals could easily be separated into two fractions, one very difficultly soluble in benzene and most other organic solvents, and another one which readily crystallized from benzene or alcohol. The difficultly soluble compound was recrystallized from alcohol. It melted at 208° C.–209° C.

Analysis: Found: C, 66.32; H, 3.56.

The more soluble product was recrystallized from 95% alcohol with the aid of charcoal, taking care that crystallization did not start before the solution had reached room temperature. The pyrone derivative was obtained in fine yellow needles, which melted at 158° C.–159° C. The yield of pure product was 2.6 grams.

Analysis: Calc'd for $C_{13}H_{10}O_4$: C, 67.8; H, 4.4. Found: C, 67.7; H, 4.3.

EXAMPLE III

*Preparation of 3-beta-acetoxy-17-[6-(4-methyl-alpha-pyronyl)]-Δ5,6-etiocholene*

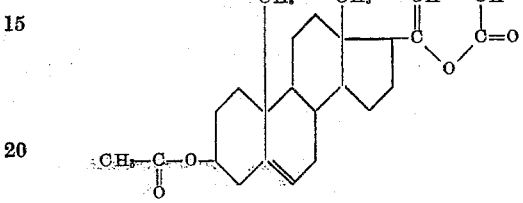

2.5 grams of pure, finely powdered 3-acetoxy-Δ 5,6-etiocholenic acid (M. P. 230°–236° C.) were kept at 0° C. with 10 cc. of pure thionylchloride. At the end of 5 hours the light yellow solution was evaporated to dryness in vacuo. 4 cc. of dry chloroform was added to the crystalline residue and evaporated in order to remove the last traces of trionyl chloride. The crystals melted partially at 158° C., leaving an unmelted residue to as high as 200° C.

The crystalline 3-acetoxy-Δ5,6-etiocholenyl chloride was dissolved in 4 cc. chloroform and 940 mg. of beta-methyl glutaconic anhydride were added. To this solution was added 20 cc. of pyridine of –20° C. and the yellow solution kept at –20° C. for one half hour. While in the refrigerator for the next 44 hours, the solution slowly turned green and deposited some solid material. 30 cc. of concentrated hydrochloric acid and 50 cc. of ice covered with 200 cc. of ether. A solid precipitate formed between the two layers which was removed by filtration. The precipitate consisted of fine platelets, which were very difficultly soluble in all common solvents. They were recrystallized from much chloroform, and did not melt up to 265° C. They represent the anhydride of 3-beta-acetoxy-Δ 5,6-etiocholenic acid.

Analysis: Calc'd for $C_{44}H_{62}O_7$: C, 75.2; H, 8.9. Found: C, 74.8; H, 8.2.

The ethereal layer was extracted once more with dilute hydrochloric acid and then with water until no more blue color went into the aqueous layer. After drying, the ether solution was brought to small volume and the alpha (3-acetoxy-(Δ 5,6-etiocholenyl)-beta-methyl glutaconic anhydride crystallized readily. Altogether 2.3 grams of crystalline product, melting at 140° C. with decomposition, were obtained (70.5% yield). Recrystallization of this product from ether-pentane yielded rosettes of fine needles. These started to decompose at 146° C. and were completely melted at around 165° C. When kept for about 5 minutes at 170° C.–175° C., the melt suddenly crystallized and melted again at 223° C.–225° C. The substance produced a permanent purple coloration with ferric chloride in alcohol.

Analysis: Calc'd for $C_{28}H_{36}O_6$: C, 71.8; H, 7.8. Found: C, 71.8; H, 7.6.

2.24 grams of crude alpha-(3-acetoxy-(Δ5,6-etiocholenyl)-beta-methyl glutaconic anhydride (M. P. 140° C.) were heated in a test tube to 140° C. and the temperature was slowly raised to 175° C.–180° C. A vivid evolution of gas occurred and finally the whole mass solidified (35 minutes). The resulting crystalline cake was dissolved in 25 cc. of warm benzene and the red solution poured through a column of 5 grams of Brockmann alumina. The column was eluted with 100 cc. of benzene and the combined light yellow filtrates were evaporated to dryness in vacuo. The residual solid weighed 1.85 grams, which corresponds to 91% of the theory. On recrystallization from alcohol there was obtained 1.35 grams melting at 227° C.–228° C. and from the mother liquors another 0.25 gram, melting at 223° C.–225° C. This corresponds to a total yield of 78% of the theory. The analytical sample crystallized from alcohol in fine shiny platelets, which melt at 227° C.–229° C. with slight sintering at 223° C.

Analysis: Calc'd for $C_{27}H_{36}O_4$: C, 76.4; H, 8.6. Found: C, 76.3; H, 8.5.

EXAMPLE IV

*Preparation of 3-beta-hydroxy-17-[6-(4-methyl-alpha-pyronyl)]-Δ5,6-etiocholene*

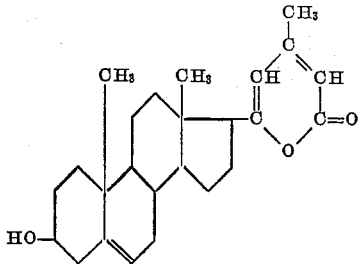

1.5 grams of 3-beta-acetoxy-17-[6-(4-methyl-alpha-pyronyl)]-Δ5,6-etiocholene were dissolved in 60 cc. of hot alcohol and 24 cc. water and 6 cc. of concentrated hydrochloric acid added. The mixture was refluxed for 4 hours and the alcohol removed in vacuo. A fine crystalline precipitate appeared, which increased on standing in the refrigerator. The crystals were filtered, washed with water and dried. They were dissolved in 100 cc. of hot benzene and the yellow solution poured through a column containing 3 grams of Brockmann alumina as adsorbent. The column was eluted with 200 cc. of benzene and the combined eluates evaporated to small volume. The 3 - beta - hydroxy - 17 - [6 - (4 - methyl - alpha - pyronyl)]-Δ5,6-etiocholene crystallized in fine feathery needles which melted at 228° C.–231° C., and gave a 35° C. melting point depression when mixed with its acetate. The yield of pure white product was 1.05 grams or 78.5% of the theory.

Analysis: Calc'd for $C_{25}H_{34}O_3$: C, 78.5; H, 9.0. Found: C, 78.1; H, 8.5.

The foregoing illustrates the practice of this invention, which however, is not to be limited thereby but is to be construed as broadly as permissible in view of the prior art and limited solely by the appended claims.

I claim:
1. 4 - methyl - 6 - (3,4 - dioxymethylene phen - yl) alpha pyrone.
2. The process for preparing 4-methyl-6-(3,4-dioxy methylene phenyl) alpha pyrone, which comprises heating alpha-piperonyl beta-methyl glutaconic anhydride above its melting point but at a temperature below decomposition temperature of the desired product, until evolution of carbon dioxide ceases.

JOSEF FRIED.

REFERENCES CITED

The following references are of record in the file of this patent:

UNITED STATES PATENTS

| Number | Name | Date |
|---|---|---|
| 2,334,180 | Elderfield et al. | Nov. 16, 1943 |
| 2,362,408 | Ruzicka | Nov. 7, 1944 |
| 2,387,366 | Touissant | Oct. 23, 1945 |

OTHER REFERENCES

Chemical Abstracts, vol. 25, 21459 (1931).
Chemical Abstracts, vol. 22, 240, 241 (1928).